United States Patent [19]
Gerst

[11] Patent Number: 6,140,387
[45] Date of Patent: Oct. 31, 2000

[54] GELS WITH THERMOTROPIC PROPERTIES

[75] Inventor: Matthias Gerst, Neustadt, Germany

[73] Assignee: BASF Aktiengesellschaft, Ludwigshafen, Germany

[21] Appl. No.: 09/101,296

[22] PCT Filed: Jan. 3, 1997

[86] PCT No.: PCT/EP97/00017

§ 371 Date: Jul. 8, 1998

§ 102(e) Date: Jul. 8, 1998

[87] PCT Pub. No.: WO97/25358

PCT Pub. Date: Jul. 17, 1997

[30] Foreign Application Priority Data

Jan. 13, 1996 [DE] Germany .......................... 196 01 085

[51] Int. Cl.⁷ ................ C09K 3/28; C08F 2/50; C08F 271/02; C08F 291/12
[52] U.S. Cl. ................ 522/79; 522/84; 522/85; 522/74; 522/114; 522/116; 522/117; 522/120; 522/121; 523/300; 524/458; 524/460; 524/529; 524/530; 524/533; 524/534; 524/535
[58] Field of Search ................ 522/85, 84, 116, 522/117, 120, 121, 114, 79, 74; 523/300; 524/529, 530, 533, 534, 535, 458, 460

[56] References Cited

U.S. PATENT DOCUMENTS 5,587,404  12/1996  Kroner et al. ............................ 522/85

FOREIGN PATENT DOCUMENTS

| 0 311 566 | 4/1989 | European Pat. Off. . |
| 0 678 534 | 4/1995 | European Pat. Off. . |
| 0 677 536 | 10/1995 | European Pat. Off. . |
| 26 58 643 | 7/1977 | Germany . |
| 93 16 261 U | 2/1994 | Germany . |
| 4 408 156 | 9/1995 | Germany . |
| 2 121 421 | 12/1983 | United Kingdom . |

*Primary Examiner*—Susan W. Berman
*Attorney, Agent, or Firm*—Oblon, Spivak, McClelland, Maier & Neustadt, P.C.

[57] ABSTRACT

Gels for thermotropic layers, obtainable by irradiating a mixture comprising a) an uncrosslinked polymer in amounts of less than 5% by weight, based on the sum of a), b) and c), b) monomers which can be polymerized by means of free radicals, and c) water or an organic solvent, or a mixture thereof, with high-energy light.

11 Claims, No Drawings

GELS WITH THERMOTROPIC PROPERTIES

The present invention relates to gels for thermotropic layers, obtainable by irradiating a mixture comprising
- a) an uncrosslinked polymer in amounts of less than 5% by weight, based on the sum of a), b) and c),
- b) monomers which can be polymerized by means of free radicals, and
- c) water or an organic solvent, or a mixture thereof, with high-energy light.

The present invention furthermore relates to a process for the production of the gels and to their use for the production of thermotropic layers.

The necessity for efficient use of energy and also utilization of solar energy for heating buildings requires highly effective and intelligent systems which match the solar-energy systems (windows, collectors, house walls) optimally to the weather conditions and user requirements. A high-quality window in an office wall ensures pleasant temperatures in winter and consequently results in a saving of energy. In spring at the latest, the same window will cause overheating and consequently expenditure of cooling energy, negating the energy saving in winter. It is therefore clear that optimized systems require control mechanisms for regulating the radiation or heat flow. This control can be partly passive, such as shading by roofs or balconies, or actively/mechanically by roller blinds or awning systems. However, many of these systems are not sufficiently effective, are too expensive or have an inadequate service life, which in turn results in increased costs.

The idea of using electro- or thermo-optical systems for control is repeatedly put forward, but has hitherto not resulted in a decisive breakthrough owing to material-related or technical problems.

An effective and inexpensive method of controlling the radiation and heat flow comprises using thermotropic layers. These layers are transparent in the unswitched state and only become cloudy above a certain switching temperature. The clouding is fully reversible, ie. the thermotropic layers become fully transparent again on cooling to temperatures below the switching temperature.

EP-A-678 534 describes gels for thermotropic layers which are obtainable from mixtures of monomers, thermotropic polymers and solvents by irradiation with high-energy light. The minimum amount of thermotropic polymer is 5% by weight, based on the mixture.

The resultant gels still have disadvantages concerning stability of the network formed from the monomers by irradiation and concerning transparency below the clear/cloudy switching temperature. The switching temperature should of course be above room temperature, preferably from 20 to 90° C.

It is an object of the present invention to provide a gel for thermotropic layers and a process for the production thereof, by means of which the abovementioned disadvantages can be overcome.

We have found that this object is achieved by the gel defined at the outset, by a process for the production thereof, and by the use of the gel for the production of thermotropic layers.

The novel gels are obtainable by irradiating a mixture comprising components a), b) and c) with high-energy light.

Suitable uncrosslinked polymers as component a) are in particular those which have thermotropic properties such that a 10% strength by weight solution of this polymer in the selected solvent c), ie. in water or an organic solvent or a mixture thereof, has, in a switching range covering less than 20° C., a change in the transmission of light having a wavelength of 600 nm so that, at a layer thickness of 10 mm, less than 50% of the incident light is transmitted above the switching range and at least 70% of the incident light is transmitted below the switching range. (During measurements with rising or falling temperature for determining the transmission, attainment by the polymer or gel of the new temperature is in each case awaited.)

The switching range or switching temperature is preferably in the range from 20 to 90° C., particularly preferably from 20 to 50° C., very particularly preferably, in the case of glazing systems, from 20 to 40° C.

The switching range should preferably be less than 10° C., particularly preferably less than 5° C., very particularly preferably only 1° C. or less.

Below the switching range, the transmission is preferably at least 90%; above the switching range, the transmission is preferably less than 30%.

In order to determine the transmission, the samples were measured using a light transmission instrument. The instrument essentially comprises a point light source and a point photocell which records the direct ray path of the light source (direct-direct measurement). The photocurrent indicated by the photocell serves as a measure of the intensity of the light passing through. A heatable sample holder is located in the ray path between the light source and the photocell. A cell filled with distilled water serves as reference.

The thermotropic properties of the polymer are preferably caused by limited solubility of the polymer in the selected solvent or solvent mixture.

The temperature above which the polymers have only limited solubility is generally referred to as the "lower critical solution temperature" (LCST) or the clouding point. Below the LCST, the polymers are substantially soluble in the selected amount in the solvent, while above the LCST, solutions of this polymer form a multiphase system which comprises at least one polymer-rich phase and a low-polymer phase. The solvent in the low-polymer phase contains less than 50% of the polymer originally dissolved in the solvent. The polymer-rich phase contains predominantly polymer, but can also contain solvent included in the polymer or solvent attached to the polymer (for example water of hydration).

Examples of suitable polymers (a) are free-radical polymers, polycondensates or polyadducts, for example polyoxymethylene.

The polymer a) is preferably a free-radical polymer and preferably comprises, for example, the following monomers:

60–100% by weight, in particular 90–100% by weight, of monomers A

0–20% by weight, in particular 0–10% by weight, of crosslinking monomers B

0–20% of other monomers C.

If water is used as the solvent c) or as the principal constituent of the solvent (more than 50% by weight of the solvent mixture), examples of suitable monomers A are N-substituted, ethylenically unsaturated lactams (substituted or unsubstituted N-vinylcaprolactams, N-vinylpyrrolidones, N-vinyloxazolidinones, N-vinylpiperidones, N-vinylsuccinimides, N-vinylmorpholinones, N-vinylbutyrolactam, N-vinylvalerolactam, N-vinylcaprolactam, N-vinylhexahydrophthalimide, N-vinylmethyloxalodidone, N-vinylethyloxazolidone and N-vinyloxazidinone). Particular preference is given to N-vinyl-2-caprolactam and N-vinyl-2-pyrrolidone.

Also suitable are N,N'-divinylimidazolidone and N-vinylsuccinimide.

Unsubstituted and N-substituted acrylamides and methacrylamides are also suitable.

Also suitable are hydroxyalkyl esters of unsaturated carboxylic acids, such as acrylic acid, methacrylic acid and itaconic acid. The hydroxyalkyl group preferably has 2–5 carbon atoms. Examples of suitable monomers are hydroxyethyl acrylate, hydroxyethyl methacrylate, hydroxypropyl acrylate, hydroxypropyl methacrylate and hydroxybutyl acrylate.

Unsubstituted and N-substituted acrylamides and methacrylamides are also suitable. Examples thereof are N-(2-hydroxyethyl)acrylamide, N-methylacrylamide, acrylamidoglycolic acid, N-butoxymethylacrylamide N-methoxymethylacrylamide, N-methoxymethylmethacrylamide; N,N-dialkylacrylamides containing $C_1$–$C_3$-alkyl groups, such as N,N-diethylacrylamide and N,N-dimethylacrylamide, and N-alkylacrylamides containing $C_1$–$C_6$-alkyl groups, such as N-ethylacrylamide, N-isopropylacrylamide and N-propylacrylamide.

Suitable monomers A are furthermore vinyl ethers of the formula I

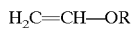

$$H_2C=CH-OR \quad\quad\quad I$$

and hydrophilic vinyl ethers of the formula II

$$H_2C=CH-OR^1 \quad\quad\quad II,$$

where

R is $C_1$–$C_{20}$-alkyl, and $R^1$ is an aliphatic or cycloaliphatic radical, which may be substituted by hydroxyl groups or may be interrupted by non-adjacent groups —Y—, Y is oxygen, sulfur, $NR_2$ or $N^+N^2R^3X^-$, where $R^2$ and $R^3$, independently of one another, are hydrogen or $C_1$–$C_4$-alkyl, and X— is a counterion, and the molar ratio between the number of carbon atoms and the total number of Y and hydroxyl groups in the aliphatic or cycloaliphatic radical $R^1$ is from 1.01:1 to 6.5:1.

Examples of vinyl ethers of the formula I which may be mentioned in particular are $C_1$–$C_4$-alkyl vinyl ethers, for example methyl vinyl ether, ethyl vinyl ether, propyl vinyl ether, isopropyl vinyl ether, n-butyl vinyl ether, isobutyl vinyl ether and, for example, dodecyl vinyl ether.

Particular preference is given to methyl vinyl ether.

In vinyl ethers of the formula II, —Y— is preferably oxygen.

Vinyl ethers of the formulae I and II can be used, for example, alone or as mixtures with one another, preferably in mixtures of from 40 to 100% by weight of vinyl ethers I and from 0 to 60% by weight of vinyl ethers II as monomer A.

If the polymer a)is also to be crosslinkable, it is also possible for monomers B which can effect covalent crosslinking of the polymer chains during or after polymerization to be copolymerized.

Monomers B of this type can be bi- or polyethylenically unsaturated compounds, for example methylenebisacrylamide, poly(ethylene oxide) diacrylates and dimethacrylates; poly(propylene oxide) diacrylates, etc.

Suitable monomers B can also be ethylenically unsaturated compounds which can undergo addition reactions with themselves or with other groups present on exposure to radiation, for example UV radiation. Examples of such monomers are cinnamoylglycidyl methacrylate, furylacryloylglycidyl methacrylate; 4-acryloxybutyl cinnamate; 2-acryloxyethyl cinnamate; 2-acryloxy-1-hydroxyethyl cinnamate, 4-acryloxybutyl furylacrylate; 2-acryloxyethyl furylacrylate; 2-acryloxy-1-hydroxyethyl furylacrylate, etc.

Also suitable are coumarine derivatives, as described, for example, in Macromolecules, 23 (1990), 2693–2697, and p-formylstyrene derivatives, as described in J. Polym. Sci. Polym. Chem. Ed. 20 (1982), 1419–1432.

The presence of monomers C is generally not necessary and is therefore not preferred.

Polymer a) particularly preferably essentially consists only of monomers A and also contains no crosslinking monomers B.

The polymer a) is therefore preferably uncrosslinked before and after irradiation with high-energy light.

Very particularly preferred polymers a) are poly-N-vinylcaprolactam, copolymers of N-vinylcaprolactam having at least 20% by weight of N-vinylcaprolactam, and polyvinyl ether homopolymers and copolymers.

The polymers a) preferably have a number average molecular weight Mn of from 1000 to 30,000 g/mol, particularly preferably from 5000 to 28,000 g/mol, very particularly preferably from 10,000 to 35,000 g/mol.

The weight average molecular weight $M_w$ is preferably from 5000 to 350,000, particularly preferably from 10,000 to 200,000.

The molecular weights $M_n$ and $M_w$ are determined by gel permeation chromatography using a polystyrene standard and dimethylformamide as eluent.

The preparation of polymers of low molecular weight is known in general terms. The molecular weight can be reduced, for example, by the concomitant use of regulators during the free-radical polymerization.

In addition to the polymers a), the mixture comprises monomers b) which can be polymerized by means of free radicals.

After irradiation with high-energy light, the monomers b) form a three-dimensional network, ie. a gel which is insoluble or only sparingly soluble in the solvent or solvent mixture used. The network formed from monomers b) preferably has no thermotropic properties or at best has a switching range at least 20° C. above the switching range of the polymer a). Any switching range which is present is preferably above the boiling point of the selected solvent or solvent mixture at atmospheric pressure (1 bar).

The monomers b) are preferably monomers which can be polymerized by means of free radicals. For example, a monomer mixture comprising from 70 to 99.9% by weight, preferably from 85 to 96% by weight, of uncrosslinkable monomers D which can be polymerized by means of free radicals, and from 0.1 to 30% by weight, preferably from 4 to 15% by weight, of crosslinkable monomers E is suitable.

Examples of suitable monomers D are vinyl esters of carboxylic acids having 1 to 20 carbon atoms which may have been partially or preferably fully hydrolyzed to vinyl alcohols, (meth)acrylamide, (meth)acrylic acid, N-substituted (meth)acrylamides, and hydrophilic vinyl ethers of the formula II. Also suitable are hydroxyl-containing (meth)acrylates, such as $C_1$–$C_{20}$-hydroxyalkyl (meth)acrylates, and N-methylolmethacrylamide.

Suitable crosslinking monomers E are those which contain at least 2 copolymerizable, ethylenically unsaturated groups or at least one ethylenically unsaturated group and at least one further reactive group, for example a group which is capable of undergoing condensation reactions.

Examples which may be mentioned are monomers containing 2 or more acryl groups, such as polyethylene oxide diacrylate and methylenebisacrylamide.

Suitable solvents c) as a constituent of the mixture are, for example, glycols, such as ethylene glycol, propylene glycol, diethylene glycol, dipropylene glycol, glycol ethers, such as glycol methyl ether, diethylene glycol monoether and diether, and water.

Preference is given to water as solvent or to a solvent mixture containing at least 60% by weight, preferably 90% by weight, of water, based on the solvent mixture.

The combination of water with one of the abovementioned solvents has the advantage that the frost stability of the gels is increased. The thermotropic layers should also remain in the applications in winter, while fulfilling the same function as in summer. It is therefore necessary to stabilize the gels against freezing. This is necessary since the freezing water can cause permanent damage to the gel or to the entire system (ie. gel and support construction). A lowering of the freezing point of the gel is achieved by adding glycols, glycol ethers or alcohols containing lower alkyl chains. The same effect can also be achieved if the solvent contains soluble salts. In the latter case, however, it must be ensured that the salts are compatible with the polymer system and that the switching temperature is not adversely affected. The amount of agent required to lower the freezing point depends on the ambient temperature in which the thermotropic layer is used.

The mixtures defined at the outset can also contain further constituents in addition to components a), b) and c).

In order to achieve good long-term serviceability of the thermotropic layers comprising gels, these can be stabilized against bacterial infestation. It is therefore appropriate to add biocides to the mixtures. These can either be organic compounds, for example formaldehyde or 1,2-benzisothiazolone, or inorganic compounds, such as sodium fluoride. The amount of biocide depends on the application (accessibility by microorganisms) and on the activity of the biozide. The fundamentals of biocide stabilization are described, for example, in Farbe und Lack, 82 (1976), 108 ff., Farbe und Lacke, 99 (1993), 105 ff., and "Lehrbuch der pharmazeutischen Chemie" (W. Schmack, K. Mayer and M. Haake; Verlag vieweg und Sohn, Braunschweig 1983), for example p. 537 ff.).

It is also preferred to add free-radical polymerization photoinitiators to the mixtures. Suitable amounts are from 0.01 to 5% by weight, particularly preferably from 0.03 to 3% by weight, based on the monomers b) which can be polymerized by means of free radicals.

A general view of suitable photoinitiators is given, for example, in the article by H. F. Gruber in Prog. Polym. Sci., Vol. 17 (1992), 953 ff.

Particularly suitable compounds for the preparation of hydrogels with water as solvent are water-soluble benzophenone derivatives (J. Appl. Polym. Sci. 32 (1986), 6209–26, Polym. Paint Colour J., 179 (1989), 684–687, Polym. Paint. Resin, 175 (1985), 246–251), sulfonated aromatic ketones (Eur. Polym. J., 27 (1991), 69–75), water-soluble thioxanthone derivatives (J. Appl. Polym. Sci., 34 (1987), 477–488), for example 4-benzoyl-N,N-dimethyl-N-(2-oxo-2-propenyloxy)ethylbenzenemethanaminium bromide, 4-benzoyl-N,N,N-trimethylbenzenemethanaminium chloride, 4-(3-dimethylamino-2-hydroxypropoxy) benzophenone methylchloride, 2-(3-dimethylamino-2-hydroxypropoxy)-3,4-dimethyl- 9H-thioxanthen-9-one methochloride.

The photoinitiator preferably has the formula

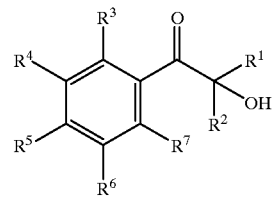

(I)

where $R^1$ and $R^2$, independently of one another, are $C_1$–$C_{10}$-alkyl, and $R^3$ to $R^7$, independently of one another, are hydrogen, $C_1$–$C_{10}$-alkyl or $C_5$–$C_{10}$-aryl, with the proviso that at least one of $R^3$ to $R^7$ is a hydrophilic radical, namely a carbonyl or carboxylate group, a sulfonyl or sulfonate group, a hydroxyl group, a polyalkylene oxide group or an organic radical having up to 30 carbon atoms and containing at least one of the above hydrophilic groups.

If the hydrophilic group is polyalkylene oxide, this is preferably a polyethylene oxide, polypropylene oxide or mixed polyethylene-propylene oxide group, preferably having 2 to 20 alkylene oxide units.

In the formula I, $R^1$ and $R^2$ are preferably $C_1$–$C_4$-alkyl, particularly preferably methyl. $R^3$ to $R^7$ are preferably $C_1$–$C_4$-alkyl or particularly preferably H. At least one, preferably one to three, particularly preferably one of the radicals $R^3$ to $R^7$ is one of the hydrophilic radicals mentioned.

The hydrophilic radical is preferably an aliphatic radical, for example an alkyl radical or alkoxy radical, having 1 to 10 carbon atoms, which may contain ether groups (—O—) and is substituted by at least one hydroxyl group.

The photoinitiator particularly preferably has the formula

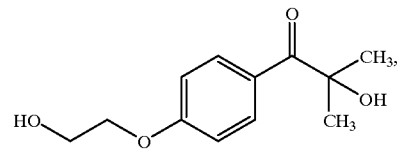

(II)

and is available as Darocure® 2959 from Ciba-Geigy.

The mixture defined at the outset preferably comprises
0.5 to less than 5% by weight, particularly preferably from 1 to 4.9% by weight, in particular from 1 to 4.5% by weight, of the uncrosslinked polymer a), from 1 to 30% by weight, particularly preferably from 3 to 27% by weight, of monomers b) which can be polymerized by means of free radicals, and from 69.5 to 98.5% by weight, particularly preferably from 70 to 96% by weight, of water, organic solvent or mixtures thereof.

The mixture can be prepared in a simple manner by combining the components followed by homogenization, for example by stirring.

The gel can then be prepared, preferably directly in the equipment intended for the thermotropic layer.

To this end, the mixture is introduced into this equipment, for example a glazing system, and irradiated with high-energy light.

However, the irradiation can also be carried out in advance and the resultant gel subsequently introduced into the corresponding equipment.

On irradiation, the monomers b) polymerize and crosslink in such a way that they form a three-dimensional network, or gel, which contains the preferably uncrosslinked polymer a), the solvent c) and, if desired, further additives.

The irradiation preferably takes place with UV light or electron beams.

The duration of the UV exposure for full gelling is sufficient when dynamic-mechanical analysis of hydrogels at 25° C. gives a storage modulus G'[Pa] that is greater than the loss modulus G" [Pa] at a measurement frequency of $\omega=1$ [rad/s]. The data are measured by means of a shear rate-controlled rotational viscometer, (RFS) Rheometrics, with a cone-and-plate geometry (diameter=25 mm, cone= 0.04 rad) at 25° C. and an angular frequency of 0.1 $s^{-1} < \omega < 100\ s^{-1}$.

Dynamic-mechanical analysis (DMA) subjects the hydrogel samples to a sinusoidal deformation with time at certain amplitudes and frequency and measure the resultant mechanical stress. The complex dynamic modules of the sample material can be determined from the deformation and stress. It comprises two components, the storage modulus as a measure of the reversibly stored deformation energy, and the loss modulus, which characterizes the energy irreversibly converted into heat.

The method is known in general terms and is described, for example, by A. Zosel in Farbe und Lack, 94 (1988) 809.

The irradiation is preferably carried out at at least 5° C., particularly preferably at least 10° C., very particularly preferably at at least 20° C. below the switching range or above the clouding point as the lower temperature limit of the switching range.

The novel gels are suitable for the production of thermotropic layers which satisfy the conditions described at the outset under polymer a) with respect to switching range and change in transparency.

At the same time, the gels have high transparency in the homogeneous state, ie. below the switching range. Even after many repetitions of the switching operation, the transparency difference remains large and the switching range narrow. The short switching time is also advantageous.

The novel gels are therefore particularly suitable for the production of glazing systems having thermotropic properties and of thermal insulation elements.

EXAMPLE

A mixture of 2.67 g of a 30% strength by weight solution of poly-N-vinylcaprolactam in water (thermotropic polymer, $M_n$=10,500, 2% by weight, based on all constituents of the gel), 32.49 g of water, 2.72 g of aqueous acrylamide solution (50% strength), 2.10 g of aqueous methylenebisacrylamide solution (2% strength), (acrylamide:methylenebisacrylamide weight ratio 97:3), 0.02 g of Darocure® 2959 photoinitiator (solid, corresponding to 2% by weight, based on all constituents of the gel), was degassed and introduced between two float-glass sheets (sheet thickness 4 mm, sheet separation 1 mm). The filled glazing unit was subsequently irradiated for 15 minutes at 10° C. under a UV lamp ($\lambda_{max}$=367 nm). The sample crosslinked to give a gel.

EXAMPLES 2 TO 4

Example 1 was repeated with a different amount of thermotropic polymer.

At the same time, the amount of water was reduced correspondingly.

The transparency of the resultant gels at T=22° C., ie. below the switching temperature, was assessed visually.

The results are shown in the table.

| Example | Concentration of the thermotropic polymer* | Visual assessment |
| --- | --- | --- |
| 1 | 2 | transparent |
| 2 | 3 | transparent |
| 3 | 4 | transparent |
| 4** | 10 | cloudy |

*based on all constituents of the gel (% by weight)
**for comparison

What is claimed is:

1. A gel for thermotropic layers, obtained by irradiating a mixture comprising
    a) from 0.5 to less than 5% by weight, based on the sum of a), b) and c), of uncrosslinked poly-N-vinylcaprolactam, uncrosslinked copolymers of N-vinylcaprolactam having at least 20% by weight of N-vinylcaprolactam, uncrosslinked polyvinyl ether homopolymers or copolymers, wherein the polymer a) has a number average molecular weight $M_n$ of from 1,000 to 30,000,
    b) from 1 to 30 wt. % of ethylenically unsaturated monomers which can be polymerized by means of free radicals, and
    c) from 69.9 to 98.9 wt. % of water or an organic solvent, or a mixture thereof,
with high-energy light.

2. A gel as claimed in claim 1, where component c) is water.

3. A gel as claimed in claim 1, where the uncrosslinked polymer a) has thermotropic properties such that a 10% strength by weight solution of this polymer in water or an organic solvent or a mixture thereof causes, in a switching range covering less than 20° C., a change in the transmission of light at a wavelength of 600 nm and a layer thickness of 10 mm so that less than 50% of the incident light is transmitted at temperatures above the switching range and at least 70% of the incident light is transmitted at temperatures below the switching range.

4. A gel as claimed in one claim 1, where the monomer or monomer mixture b), after irradiation with high-energy light, forms a three-dimensional network which does not have thermotropic properties as defined in claim 5 or which has a switching range at least 20° C. above the switching range of the polymer a).

5. A gel as claimed in claim 1, where the mixture additionally comprises a photoinitiator.

6. A gel as claimed in claim 1, wherein a) is present in an amount of from 2 to 4% by weight.

7. A gel as claimed in claim 6, wherein polymer a) is uncrosslinked poly-N-vinylcaprolactam or uncrosslinked copolymers of N-vinylcaprolactam having at least 20% weight of N-vinylcaprolactam.

8. A process for the preparation of a gel having thermotropic properties as claimed in claim 1, which comprises irradiating a mixture comprising
    a) from 0.5 to less than 5% by weight, based on the sum of a), b) and c), of uncrosslinked poly-N-vinylcaprolactam, uncrosslinked copolymers of N-vinylcaprolactam having at least 20% by weight of N-vinylcaprolactam, uncrosslinked polyvinyl ether homopolymers or copolymers, wherein the polymer a) has a number average molecular weight Mn of from 1,000 to 30,000, b) from 1 to 30 wt. % of ethylenically unsaturated monomers which can be polymerized by means of free radicals, and c) from 69.9 to 98.9 wt. % of water or an organic solvent, or a mixture thereof, with high-energy light.

9. A method comprising exposing to incident light thermotropic layers of a gel as claimed in claim 1 which, in a switching range covering less than 20° C., change their transparency so that, at a layer thickness of 10 mm, less than 50% of the incident light having a wavelength of 600 nm is transmitted at temperatures above the switching range and at least 70% of the incident light is transmitted at temperatures below the switching range.

10. A glazing system having thermotropic properties, obtained using a gel as claimed in claim 1.

11. A thermal insulation element obtained using a gel as claimed in claim 1.

* * * * *